(12) United States Patent
Lin

(10) Patent No.: US 8,392,744 B2
(45) Date of Patent: *Mar. 5, 2013

(54) CLOCK DISTRIBUTION APPARATUS, SYSTEMS, AND METHODS

(75) Inventor: Feng Lin, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,981

(22) Filed: Oct. 3, 2011

(65) Prior Publication Data

US 2012/0019295 A1    Jan. 26, 2012

Related U.S. Application Data

(63) Continuation of application No. 12/051,745, filed on Mar. 19, 2008, now Pat. No. 8,032,778.

(51) Int. Cl.
G06F 1/00 (2006.01)
H03L 7/00 (2006.01)
H03L 7/06 (2006.01)

(52) U.S. Cl. ........ 713/500; 327/152; 327/153; 327/154; 327/158; 327/236

(58) Field of Classification Search .................. 713/500; 327/152, 153, 154, 158, 236
See application file for complete search history.

(56) References Cited

U.S. PATENT DOCUMENTS

| | | | |
|---|---|---|---|
| 5,334,885 A * | 8/1994 | Morris | 326/83 |
| 6,072,347 A | 6/2000 | Sim | |
| 6,628,158 B2 | 9/2003 | Forbes | |
| 6,867,627 B1 * | 3/2005 | Murtagh | 327/158 |
| 6,937,080 B2 | 8/2005 | Hairapetian | |
| 7,138,845 B2 | 11/2006 | Lin | |
| 7,279,944 B2 | 10/2007 | Lu | |
| 7,288,971 B1 | 10/2007 | Plasterer et al. | |
| 7,564,268 B2 | 7/2009 | Buell | |
| 8,032,778 B2 * | 10/2011 | Lin | 713/500 |
| 2002/0196061 A1 | 12/2002 | Atyunin et al. | |
| 2003/0155953 A1 | 8/2003 | Hirata et al. | |
| 2004/0145397 A1 * | 7/2004 | Lutkemeyer | 327/158 |
| 2004/0213051 A1 | 10/2004 | Lin et al. | |
| 2005/0134337 A1 | 6/2005 | Lee et al. | |
| 2005/0134361 A1 | 6/2005 | Tschanz et al. | |
| 2005/0162208 A1 | 7/2005 | Zhang et al. | |
| 2006/0028905 A1 | 2/2006 | Johnson et al. | |
| 2006/0203948 A1 | 9/2006 | Lin | |
| 2006/0273836 A1 * | 12/2006 | Lin | 327/158 |
| 2007/0075757 A1 | 4/2007 | Kumar et al. | |
| 2007/0164797 A1 | 7/2007 | Law et al. | |
| 2008/0089459 A1 | 4/2008 | Vlasenko et al. | |
| 2009/0066379 A1 | 3/2009 | Kim et al. | |
| 2009/0189657 A1 | 7/2009 | Huang | |
| 2009/0240970 A1 | 9/2009 | Lin | |
| 2010/0060294 A1 | 3/2010 | Suda et al. | |

OTHER PUBLICATIONS

Heydari, Payam, et al., "Design of Ultrahigh-Speed Low-Voltage CMOS CML Buffers and Latches", IEEE Transactions on Very Large Scale Integration (VLSI) Systems, 12(10), (Oct. 2004), 1081-1093.

(Continued)

Primary Examiner — Vincent Tran
(74) Attorney, Agent, or Firm — Schwegman, Lundberg & Woessner, P.A.

(57) ABSTRACT

Apparatus, systems, and methods are disclosed that operate to adjust power received by a clock distribution network at least partially based on operating conditions of an integrated circuit. Additional apparatus, systems, and methods are disclosed.

29 Claims, 10 Drawing Sheets

OTHER PUBLICATIONS

Maneatis, John G., "Low-Jitter Process-Independent DLL and PLL Based on Self-Biased Techniques", IEEE Journal of Solid-State Circuits, 31(11), (Nov. 1996), 1723-1732.

Mizuno, Masayuki, et al., "A GHz MOS Adaptive Pipeline Technique Using MOS Current-Mode Logic", IEEE Journal of Solid-State Circuits, vol. 31, No. 6, (Jun. 1996), 784-791.

Sidiropoulos, Stefanos, et al., "A Semidigital Dual Delay-Locked Loop", IEEE Journal of Solid-State Circuits, vol. 32, (Nov. 1997), 1683-1692.

Tanabe, Akira, et al., "0.18m CMOS 10-Gb/s Multiplexer/Demultiplexer ICs Using Current Mode Logic with Tolerance to Threshold Voltage Fluctuation", IEEE Journal of Solid-State Circuits, 36(6), (Jun. 2001), 988-996.

* cited by examiner

CLOCK DISTRIBUTION APPARATUS, SYSTEMS, AND METHODS

PRIORITY APPLICATION

This application is a continuation of U.S. application Ser. No. 12/051,745, filed Mar. 19, 2008, now U.S. Pat No. 8,032,778 which is incorporated herein by reference in its entirety.

BACKGROUND

An integrated circuit can include a large number of sequential elements that perform various logic functions such as mathematical operations. A clock signal may be used as a timing reference to synchronize data or logic operations performed by the sequential elements positioned at different locations in the integrated circuit.

A clock distribution network (CDN) distributes a clock signal to the sequential elements through different interconnect segments across the integrated circuit. The CDN must distribute the clock signal with accuracy, particularly when the frequency of the clock signal is high. Inaccuracy in the clock signal can result in one clock edge not arriving at a location in the integrated circuit relative to another clock edge. Two types of clock inaccuracy are referred to as clock "skew" and clock "jitter." Clock "skew" is a difference in the time that the clock signal reaches different locations in the integrated circuit. Electromagnetic propagation delays, buffer delays in a distribution network, resistive-capacitive (RC) delays associated with various distribution lines in the distribution network, and variations in the manufacturing process, temperature gradients, power supply, and load capacitance all may cause clock "skew." Clock "jitter" is a distortion in a cycle and phase difference of a clock signal accumulated over time, and clock "jitter" can be exacerbated by noise.

DETAILED DESCRIPTION

The inventor has discovered that it is advantageous to adjust power received by a clock distribution network (CDN) in an integrated circuit at least partially based on operating conditions of the integrated circuit. In particular, the inventor has discovered that it is advantageous to adjust power received by the CDN at least partially based on the frequency of a clock signal distributed by the CDN, process variations and temperature conditions of the integrated circuit, and voltages within the integrated circuit. Adjusting power received by the CDN may reduce power consumption in the integrated circuit while maintaining performance and accuracy in the clock signal distributed by the CDN.

Figure 1:
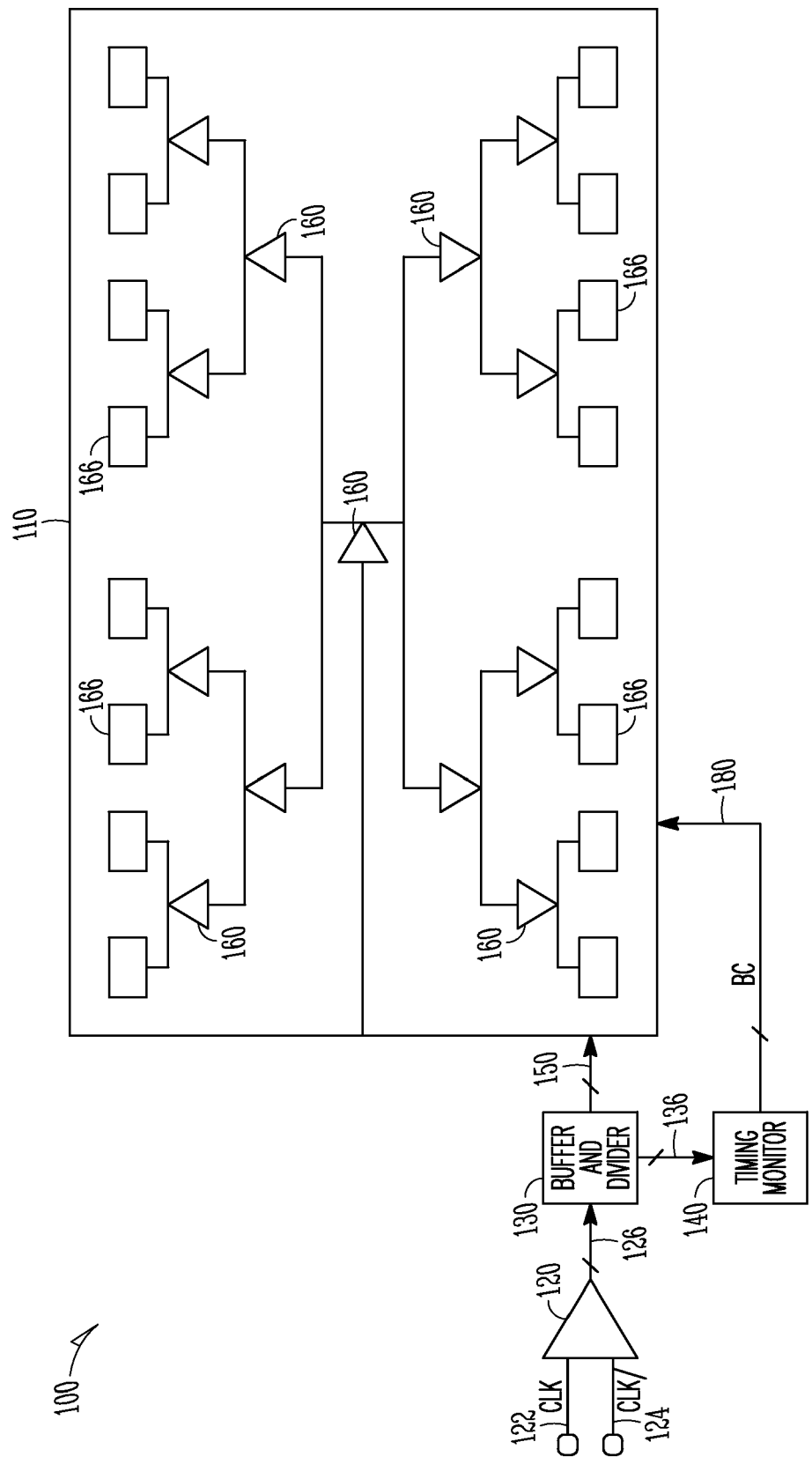
FIG. 1 is a block diagram of a clock system in an integrated circuit according to an embodiment of the invention.

FIG. 1 is a block diagram of a clock system 100 in an integrated circuit according to an embodiment of the invention. The clock system 100 distributes a differential clock signal through a CDN 110. A differential input buffer 120 is coupled to receive a clock signal CLK at a first input 122 and an inverted clock signal CLK/ at a second input 124. The "/" designation indicates that the inverted clock signal CLK/ is inverted with respect to the clock signal CLK. The clock signal CLK and the inverted clock signal CLK/ together are a differential clock signal and may be external to the integrated circuit. The differential input buffer 120 couples the differential clock signal through lines 126 to buffer and divider circuits 130. The differential clock signal coupled from the differential input buffer 120 is an internal clock signal in the integrated circuit. The buffer and divider circuits 130 couple the differential clock signal through lines 136 to a timing monitor circuit 140 and through lines 150 to the CDN 110. The differential clock signal is distributed through the CDN 110 by a collection of buffer circuits 160 coupled together in a pattern called a tree. The CDN 110 has an H-tree arrangement of buffer circuits 160 according to an embodiment of the invention. Each buffer circuit 160 includes an input coupled to an output of a preceding buffer circuit 160 to receive the differential clock signal. Each buffer circuit 160 generates the differential clock signal at an output that may be coupled to a next buffer circuit 160. The CDN 110 distributes the differential clock signal to multiple circuits 166 located throughout the integrated circuit, each circuit 166 being coupled to an output of a respective buffer circuit 160. The timing monitor circuit 140 is configured to generate bias control (BC) signals on lines 180 that are coupled to the buffer circuits 160 to adjust power received by the buffer circuits 160 as will be described hereinbelow. The single lines between the individual buffer circuits 160 and between the buffer circuits 160 and the circuits 166 shown in FIG. 1 represent dual lines to carry the differential clock signal in the CDN 110.

Figure 2:
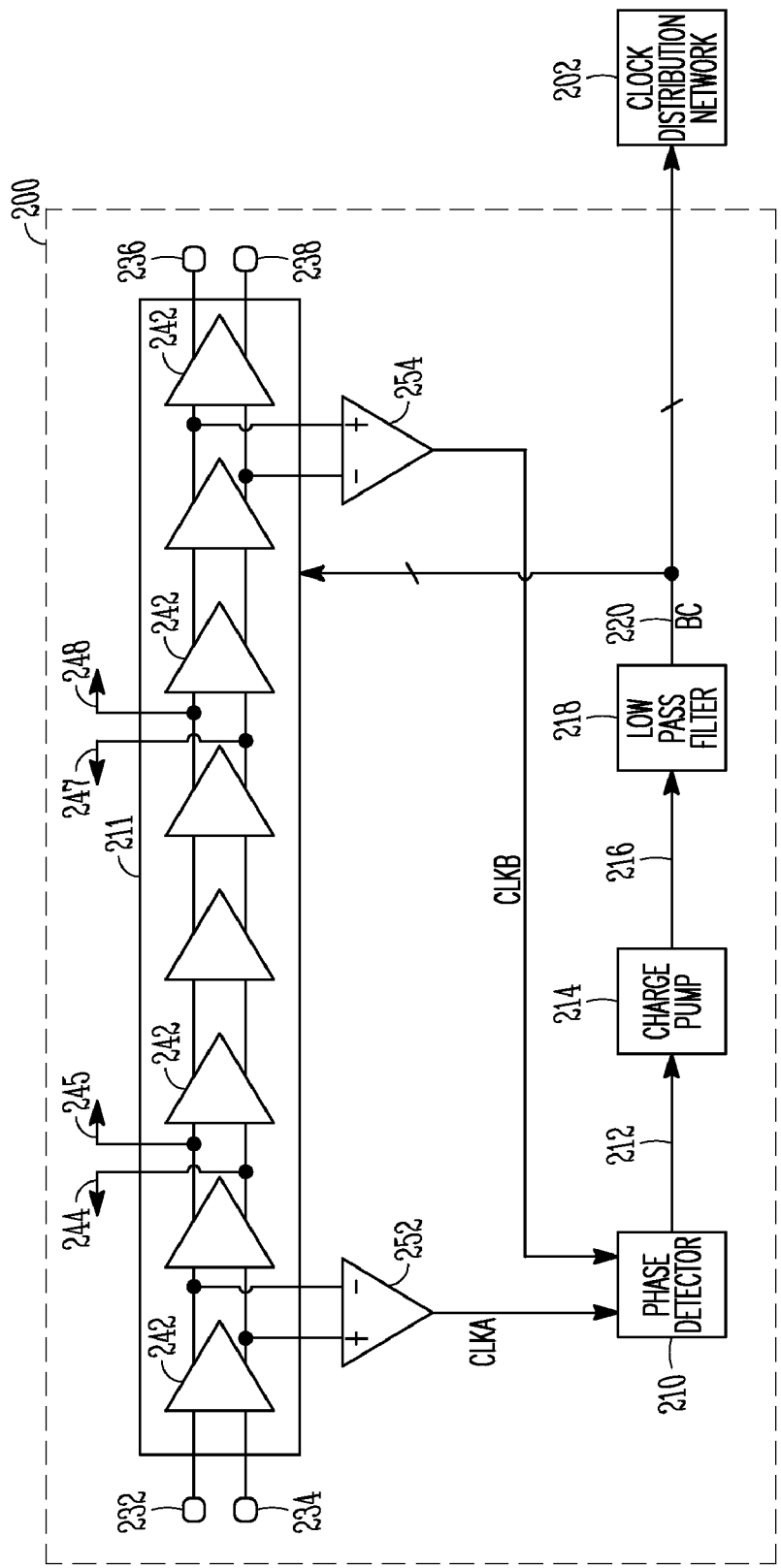
FIG. 2 is a block diagram of a voltage controlled delay line (VCDL) and a clock distribution network (CDN) according to an embodiment of the invention.

FIG. 2 is a block diagram of a timing monitor circuit 200 and a CDN 202 according to an embodiment of the invention. The timing monitor circuit 200 is a feedback loop including a voltage controlled delay line (VCDL) that locks a clock signal by adjusting BC signals with reference to the clock signal, and may be used to generate one or more shifted clock signals. In locking the clock signal the timing monitor circuit 200 is determining a frequency of the clock signal. The timing monitor circuit 200 is an example of the timing monitor circuit 140 shown in FIG. 1, and the CDN 202 is an example of the CDN 110 in FIG. 1 according to an embodiment of the invention.

The timing monitor circuit 200 includes a phase detector 210 that is configured to receive a first clock signal CLKA and a second clock signal CLKB from different locations in a VCDL 211. The phase detector 210 is configured to detect a phase difference between the second clock signal CLKB and the first clock signal CLKA and to generate an error signal quantifying the phase difference on a line 212. A charge pump circuit 214 is coupled to the line 212 to perform a charge pumping function on the error signal received from the phase detector 210 to generate a pumped signal on a line 216. A low pass filter 218 is coupled to the line 216 to attenuate selected high frequency components in the pumped signal from the charge pump circuit 214 and to generate BC signals on a plurality of lines 220. The low pass filter 218 includes a bias generator to generate the BC signals on the lines 220. The BC signals are coupled from the lines 220 to delay elements in the VCDL 211 to control the phase difference between the second clock signal CLKB and the first clock signal CLKA. The VCDL 211 is coupled to receive an input differential clock signal at two input terminals 232 and 234 and generates a delayed differential clock signal on two output terminals 236 and 238. The VCDL 211 includes a plurality of serially-coupled delay elements 242 that each impart a delay to the input differential clock signal. The delay elements 242 are each configured to generate a differential output signal that is delayed relative to a differential input signal, so that a differential signal passing through the VCDL 211 is successively delayed by each delay element 242. The delay elements 242 are coupled to receive the BC signals from the lines 220, and the delay imparted by each delay element 242 is changed by adjusting the BC signals. The delay elements 242 may be configured to provide a variable gain at each stage, or they may be configured to provide a fixed gain at each stage. Each delay element 242 may be a differential amplifier according to an embodiment of the invention. Eight delay elements 242 are shown in the VCDL 211 of FIG. 2, although more or less delay elements 242 may be in the VCDL 211 according to alternate embodiments of the invention.

The VCDL 211 may be tapped to provide clock signals at selected intermediate positions for synchronization or other purposes. For example, clock signals with different phases may be tapped from lines 244, 245, 247, and 248. These clock signals may have phases of 0, 90, 180, and 270 degrees, respectively, according to embodiments of the invention.

A first buffer circuit 252 includes two inputs coupled respectively to separate lines in the VCDL 211 to access the differential clock signal from a location near the two input terminals 232 and 234. The first clock signal CLKA is generated from the differential clock signal by the first buffer circuit 252 at an output coupled to the phase detector 210. A second buffer circuit 254 includes two inputs coupled respectively to separate lines in the VCDL 211 to access the differential clock signal from a location near the two output terminals 236 and 238. The second clock signal CLKB is generated from the differential clock signal by the second buffer circuit 254 at an output coupled to the phase detector 210. The first buffer circuit 252 and the second buffer circuit 254 are comparators according to an embodiment of the invention.

The VCDL 211, the phase detector 210, the charge pump circuit 214, and the low pass filter 218 modify the BC signals until a specific phase relationship exists between the first clock signal CLKA and the second clock signal CLKB to lock the input differential clock signal. The delay imparted by each of the delay elements 242 in the VCDL 211 changes in response to changes in the BC signals. The BC signals are modified by the timing monitor circuit 200 in response to changes in the frequency of the input differential clock signal, process variations and temperature conditions of the integrated circuit, and voltages within the integrated circuit to keep the timing monitor circuit 200 locked to the input differential clock signal.

The BC signals are coupled from the lines 220 to the CDN 202 to adjust power received by buffer circuits in the CDN 202 similar to the buffer circuits 160 shown in FIG. 1.

The delay elements 242 in the VCDL 211 are similar in structure and function to the buffer circuits 160 in the CDN 110 shown in FIG. 1 according to embodiments of the invention. The delay elements 242 may be identical to the buffer circuits 160. The delay elements 242 may be smaller or larger than the buffer circuits 160. The BC signals have a similar effect on power received by the delay elements 242 in the VCDL 211 and the buffer circuits 160 in the CDN 110.

Figure 3:
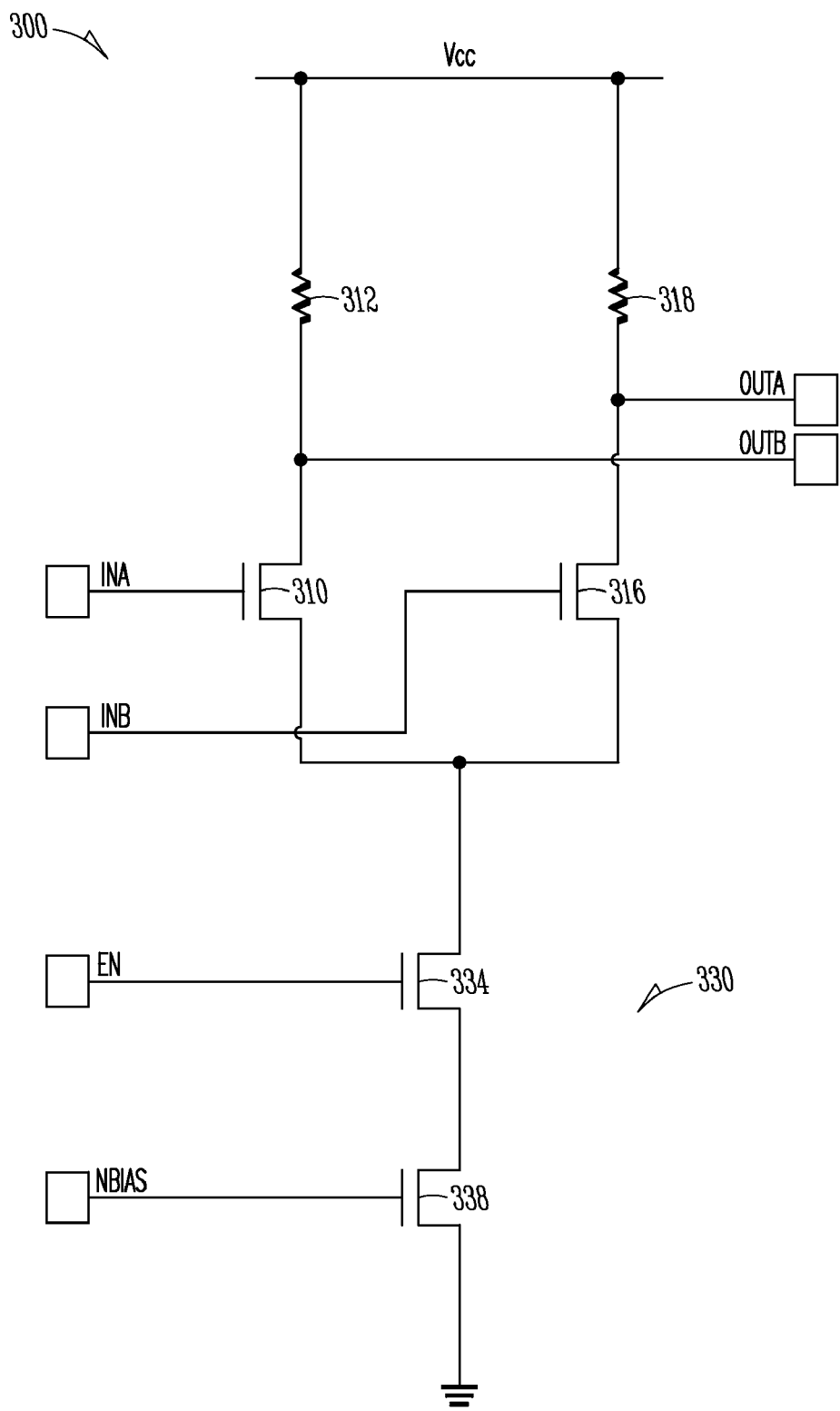
FIG. 3 is an electrical schematic diagram of a buffer circuit according to an embodiment of the invention.

FIG. 3 is an electrical schematic diagram of a buffer circuit 300 according to an embodiment of the invention. The buffer circuit 300 is a current-mode logic buffer circuit that receives a differential input signal and generates a differential output signal. The buffer circuit 300 is an example of one of the buffer circuits 160 shown in FIG. 1 or one of the delay elements 242 shown in FIG. 2.

A first N-channel transistor 310 has a drain coupled to a first load network 312, a source, and a gate coupled to receive a first input signal INA. A second N-channel transistor 316 has a drain coupled to a second load network 318, a source coupled to the source of the first N-channel transistor 310 and a bias network 330, and a gate coupled to receive a second input signal INB. A first output signal OUTA is generated at the drain of the second N-channel transistor 316 and a second output signal OUTB is generated at the drain of the first N-channel transistor 310. The first load network 312 is a resistor coupled between a positive voltage supply Vcc and the drain of the first N-channel transistor 310 and the second load network 318 is a resistor coupled between Vcc and the drain of the second N-channel transistor 316 according to an embodiment of the invention. The first load network 312 and the second load network 318 modulate a voltage swing in the buffer circuit 300.

The bias network 330 includes a third N-channel transistor 334 having a drain coupled to the source of the first N-channel transistor 310 and the source of the second N-channel transistor 316, a source, and a gate coupled to receive an enable signal EN. The bias network 330 also includes a fourth N-channel transistor 338 having a drain coupled to the source of the third N-channel transistor 334, a source coupled to a low voltage reference such as a ground voltage reference, and a gate coupled to receive a BC signal NBIAS. The enable signal EN enables the buffer circuit 300 and the BC signal NBIAS adjusts power received by the buffer circuit 300. The BC signal NBIAS is one of the BC signals described with reference to FIG. 2.

Figure 4:
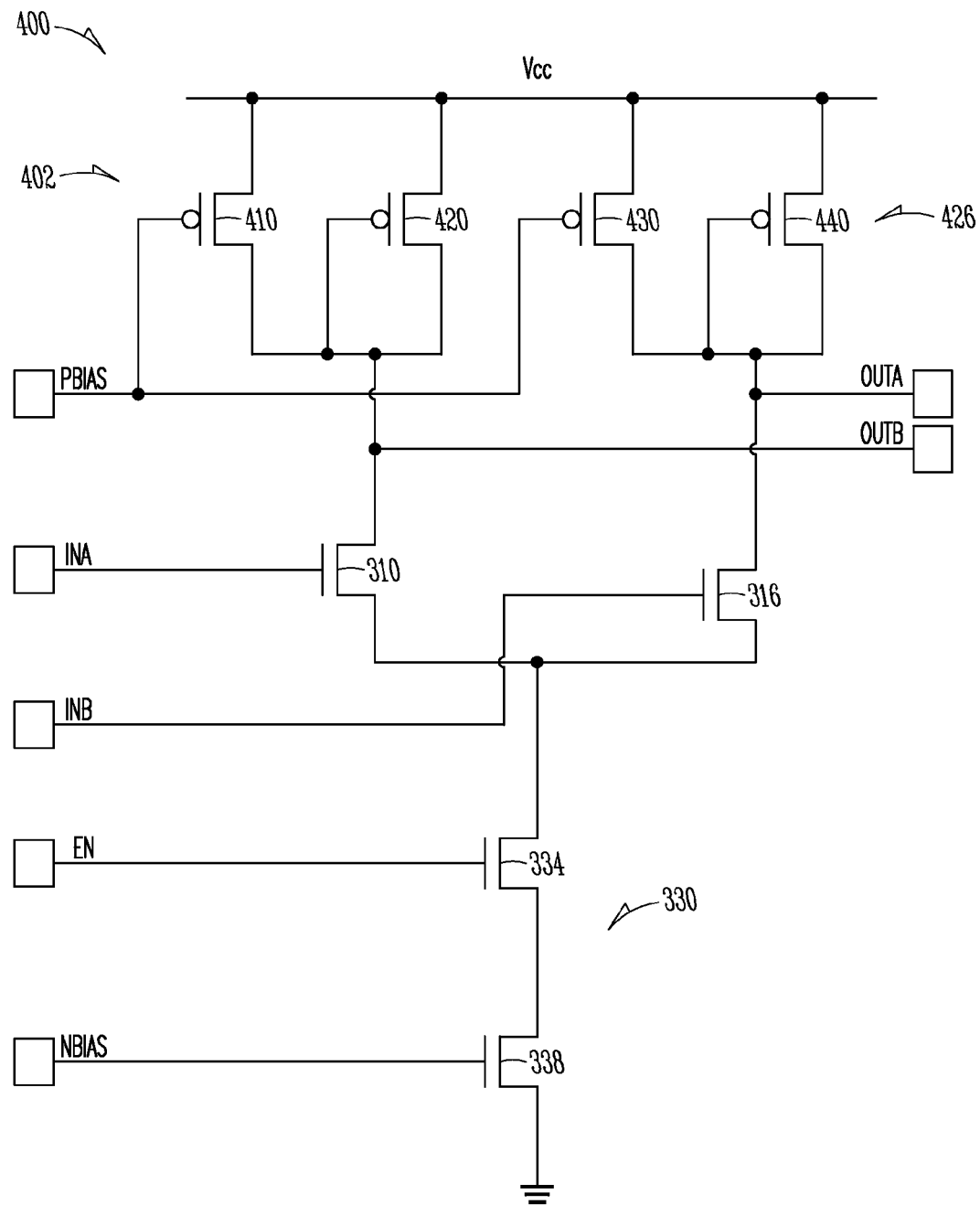
FIG. 4 is an electrical schematic diagram of a buffer circuit according to an embodiment of the invention.

FIG. 4 is an electrical schematic diagram of a buffer circuit 400 according to an embodiment of the invention. The buffer circuit 400 is a current-mode logic buffer circuit that receives a differential input signal and generates a differential output signal. The buffer circuit 400 is an example of one of the buffer circuits 160 shown in FIG. 1 or one of the delay elements 242 shown in FIG. 2. The buffer circuit 400 includes many elements similar to the buffer circuit 300 shown in FIG. 3, and similar elements have been given the same reference numerals and will not be described further herein for purposes of brevity.

A first load network 402 includes a first P-channel transistor 410 having a source coupled to a positive voltage supply Vcc, a gate coupled to receive a BC signal PBIAS, and a drain coupled to the drain of the first N-channel transistor 310. The first load network 402 also includes a second P-channel transistor 420 having a source coupled to Vcc, and a gate and a drain coupled to the drain of the first N-channel transistor 310.

Similarly, a second load network 426 includes a third P-channel transistor 430 having a source coupled to Vcc, a gate coupled to receive the BC signal PBIAS, and a drain coupled to the drain of the second N-channel transistor 316. The second load network 426 also includes a fourth P-channel transistor 440 having a source coupled to Vcc, and a gate and a drain coupled to the drain of the second N-channel transistor 316. The BC signals PBIAS and NBIAS are two of the BC signals described with reference to FIG. 2. The first load network 402 and the second load network 426 modulate a voltage swing in the buffer circuit 400.

Figure 5:
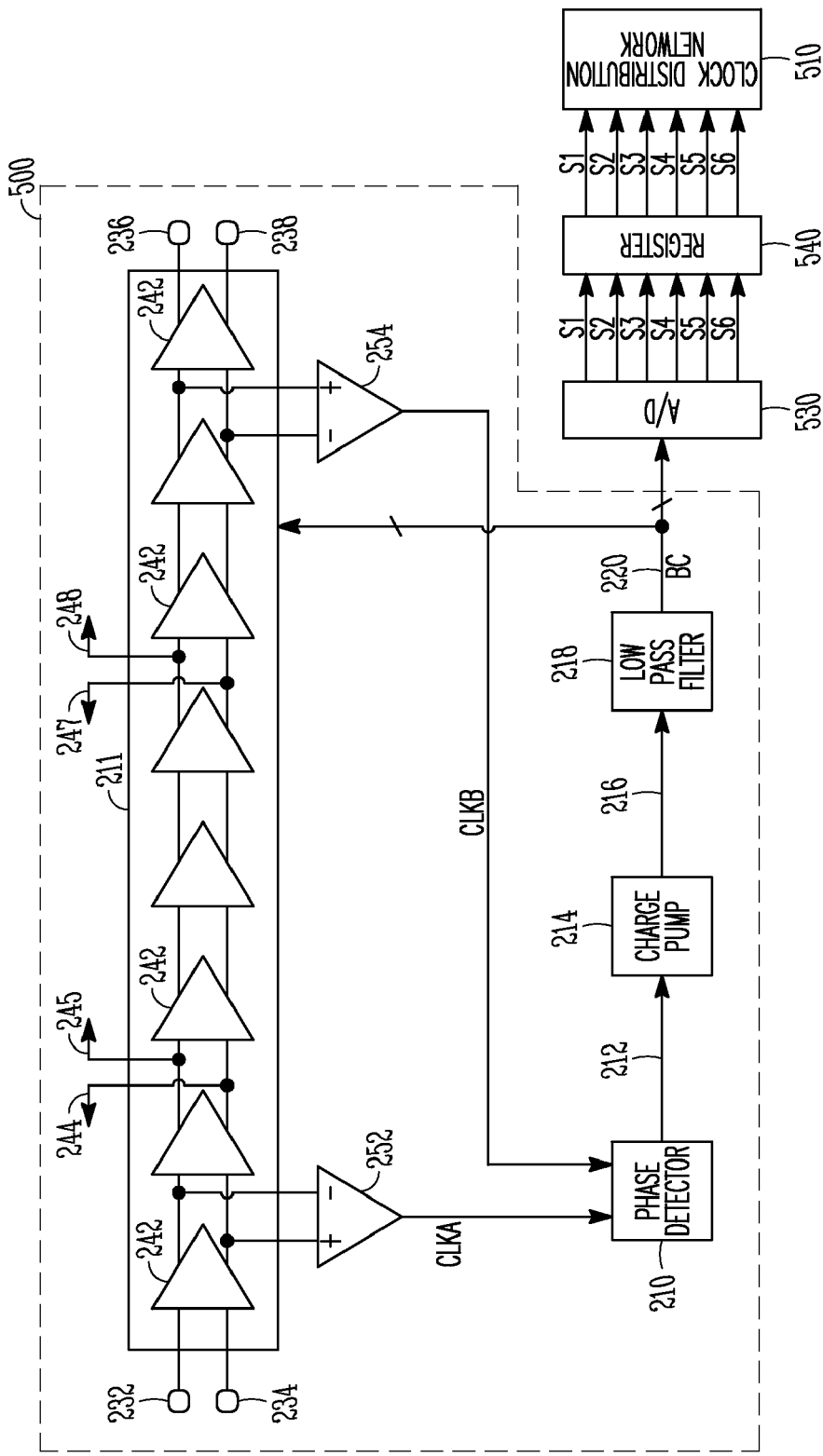
FIG. 5 is a block diagram of a VCDL, a CDN, and digital circuitry according to an embodiment of the invention.

FIG. 5 is a block diagram of a timing monitor circuit 500, a CDN 510, and digital circuitry according to an embodiment of the invention. The timing monitor circuit 500 is a feedback loop including a VCDL that locks a clock signal by adjusting BC signals with reference to the clock signal, and may be used to generate one or more shifted clock signals. In locking the clock signal the timing monitor circuit 500 is determining a frequency of the clock signal. The timing monitor circuit 500 includes many elements similar to the elements of the timing monitor circuit 200 shown in FIG. 2, and operates in a similar manner, and similar elements have been given the same reference numerals and will not be described further herein for purposes of brevity. The timing monitor circuit 500 is an example of the timing monitor circuit 140 shown in FIG. 1, and the CDN 510 is an example of the CDN 110 in FIG. 1 according to an embodiment of the invention.

The BC signals generated by the low pass filter 218 are coupled over the lines 220 to an analog-to-digital (A/D) converter 530. The A/D converter 530 converts the BC signals into digital BC signals S1, S2, S3, S4, S5, and S6 that are coupled to be stored in a register 540. The CDN 510 receives the digital BC signals S1-S6 from the register 540. The CDN 510 is shown as the CDN 110 in FIG. 1 according to an embodiment of the invention. The digital BC signals S1-S6 are applied to adjust power received by the buffer circuits 160 in the CDN 510.

Figure 6:
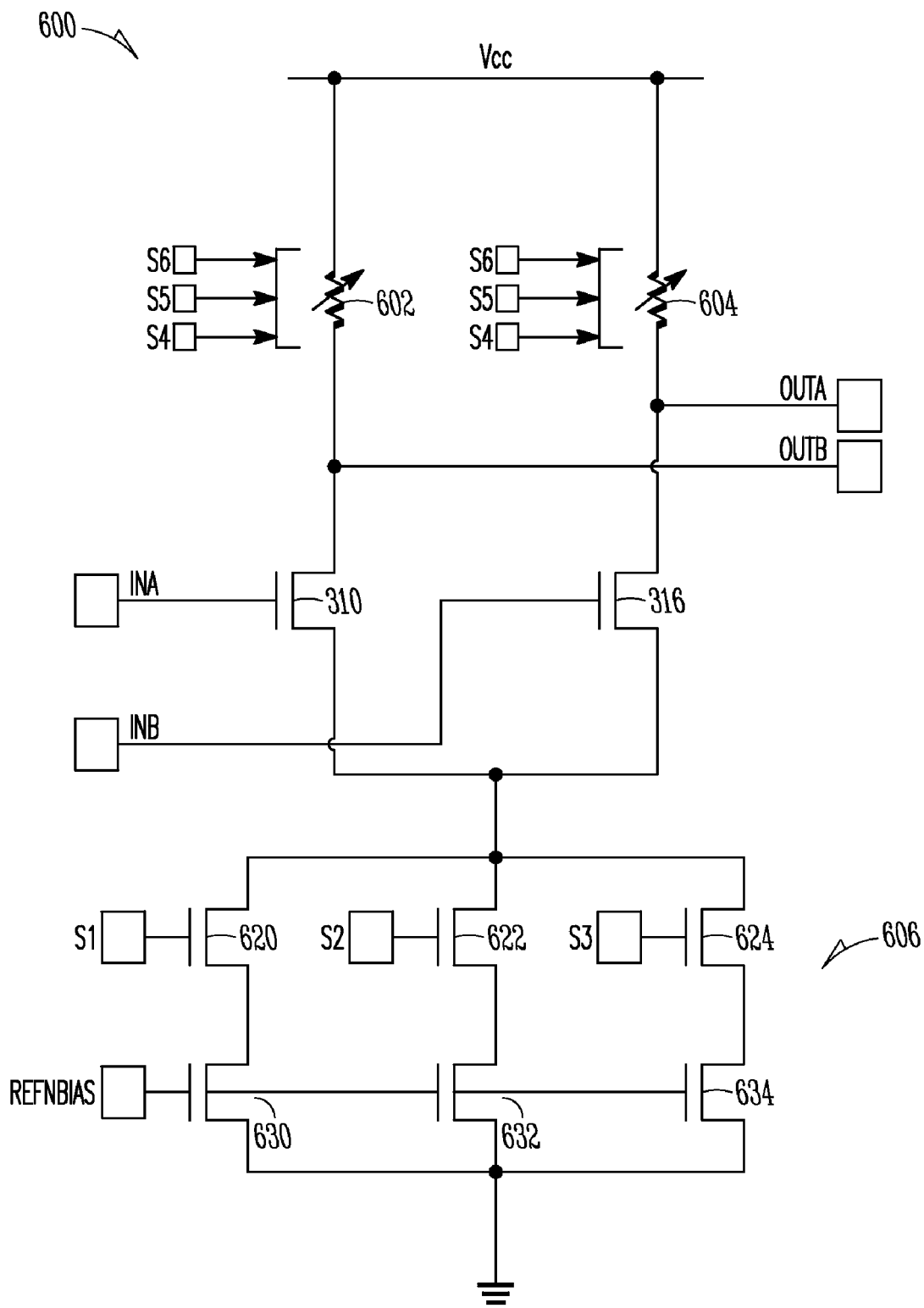
FIG. 6 is an electrical schematic diagram of a buffer circuit according to an embodiment of the invention.

FIG. 6 is an electrical schematic diagram of a buffer circuit 600 according to an embodiment of the invention. The buffer circuit 600 is a current-mode logic buffer circuit that receives a differential input signal and generates a differential output signal. The buffer circuit 600 is an example of one of the buffer circuits 160 shown in FIG. 1 or one of the delay elements 242 shown in FIG. 2. The buffer circuit 600 includes many elements similar to the buffer circuit 300 shown in FIG. 3, and similar elements have been given the same reference numerals and will not be described further herein for purposes of brevity.

A first load network 602 in the buffer circuit 600 is an adjustable resistor coupled to receive digital BC signals S4, S5, and S6 to adjust its resistance. The adjustable resistor 602 is coupled between a positive voltage supply Vcc and the drain of the first N-channel transistor 310. A second load network 604 in the buffer circuit 600 is an adjustable resistor coupled to receive the digital BC signals S4, S5, and S6 to adjust its resistance. The adjustable resistor 604 is coupled between Vcc and the drain of the second N-channel transistor 316. The adjustable resistors 602 and 604 are adjusted to modulate a voltage swing in the buffer circuit 600. The adjustable resistors 602 and 604 may be adjusted by fewer or more than three digital BC signals according to embodiments of the invention.

A bias network 606 in the buffer circuit 600 is coupled to draw current from the source of the first N-channel transistor 310 and the source of the second N-channel transistor 316. The bias network 606 includes three digitally controlled N-channel transistors 620, 622, and 624 each having a drain coupled to the source of the first N-channel transistor 310 and the source of the second N-channel transistor 316, a source, and a gate coupled to receive a respective digital BC signal S1, S2, or S3. The digitally controlled N-channel transistors 620, 622, and 624 are thereby coupled in parallel. The source of each of the digitally controlled N-channel transistors 620, 622, and 624 is coupled to a drain of a respective N-channel bias transistor 630, 632, and 634. Sources of the bias transistors 630, 632, and 634 are coupled to a low voltage reference such as a ground voltage reference, and gates of the bias transistors 630, 632, and 634 are coupled to a reference bias voltage REFNBIAS.

The reference bias voltage REFNBIAS is generated by a common reference generator such as a bandgap reference generator (not shown). The reference bias voltage REFNBIAS won't change substantially if there are changes in the frequency of the input differential clock signal, process variations and temperature conditions of the integrated circuit, or voltages within the integrated circuit. The combination of the digital BC signals S1-S3 with the reference bias voltage REFNBIAS will mimic the desired results from the BC signals generated by the low pass filter 218 in the timing monitor circuits 200 or 500. The reference bias voltage REFNBIAS is also used as a reference in the A/D converter 530 as it converts the BC signals into the digital BC signals.

The bias transistors 630, 632, and 634 are coupled in parallel with respect to each other, and each of the digitally controlled N-channel transistors 620, 622, and 624 is coupled in series with one of the bias transistors 630, 632, and 634 to operate as a switch to select its respective bias transistor 630, 632, and 634 to draw current from the source of the first N-channel transistor 310 and the source of the second N-channel transistor 316. The digital BC signals S1-S3 thereby adjust power received by the buffer circuit 600. The bias network 606 may include fewer or more transistors coupled to receive fewer or more than three digital BC signals according to embodiments of the invention.

Figure 7:
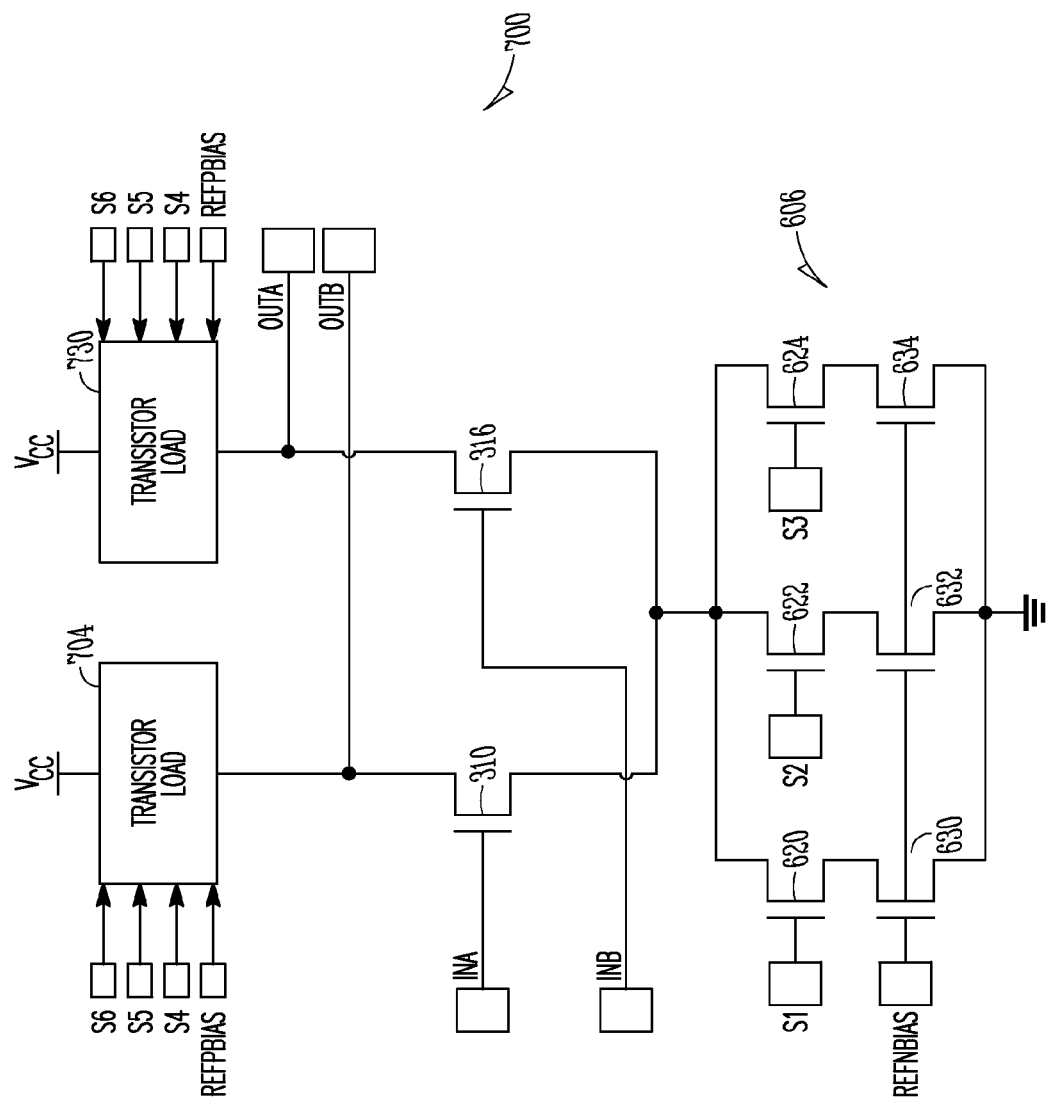
FIG. 7 is an electrical schematic diagram of a buffer circuit according to an embodiment of the invention.

FIG. 7 is an electrical schematic diagram of a buffer circuit 700 according to an embodiment of the invention. The buffer circuit 700 is a current-mode logic buffer circuit that receives a differential input signal and generates a differential output signal. The buffer circuit 700 is an example of one of the buffer circuits 160 shown in FIG. 1 or one of the delay elements 242 shown in FIG. 2. The buffer circuit 700 includes many elements similar to the buffer circuit 600 shown in FIG. 6, and similar elements have been given the same reference numerals and will not be described further herein for purposes of brevity.

A first transistor load network 704 and a second transistor load network 730 in the buffer circuit 700 are load networks of transistors similar in structure to the bias network 606 shown in FIG. 6 with P-channel transistors instead of N-channel transistors. Each of the first transistor load network 704 and the second transistor load network 730 is coupled to receive the digital BC signals S4, S5, and S6 and a reference bias voltage REFPBIAS to control the load networks 704 and 730 to modulate a voltage swing in the buffer circuit 700. The first transistor load network 704 and the second transistor load network 730 may each receive fewer or more than three digital BC signals according to embodiments of the invention.

The reference bias voltage REFPBIAS is generated by a common reference generator such as a bandgap reference generator (not shown) in a manner similar to the reference bias voltage REFNBIAS described above with reference to FIG. 6. The reference bias voltage REFPBIAS won't change substantially if there are changes in the frequency of the input differential clock signal, process variations and temperature conditions of the integrated circuit, or voltages within the integrated circuit. The combination of the digital BC signals S4-S6 with the reference bias voltage REFPBIAS will mimic the power adjustment that would result from the direct application of the analog BC signals generated by the low pass filter 218 in the timing monitor circuits 200 or 500. The reference bias voltage REFPBIAS is also used as a reference in the A/D converter 530 as it converts the BC signals into the digital BC signals.

Figure 8:
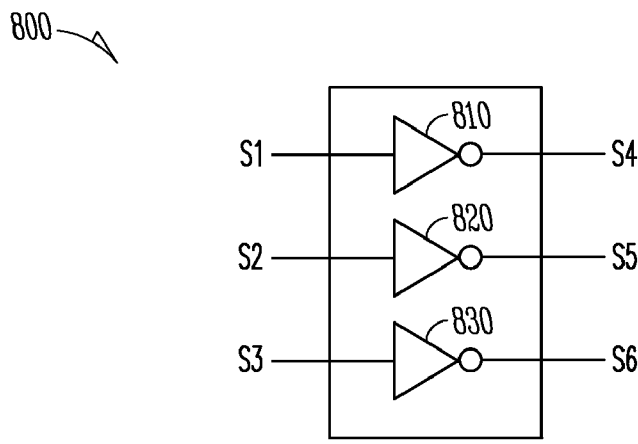
FIG. 8 is an electrical schematic diagram of an inverter circuit according to an embodiment of the invention.

FIG. 8 is an electrical schematic diagram of an inverter circuit 800 according to an embodiment of the invention. The digital BC signals S4, S5, and S6 are inverted versions of the respective digital BC signals S1, S2, and S3 described with reference to FIG. 2 and FIG. 5 in some embodiments of the invention. The inverter circuit 800 includes inverters to generate the digital BC signals S4, S5, and S6 in the following manner. The inverter circuit 800 includes a first inverter 810 having an input coupled to receive the digital BC signal S1 and an output to generate the digital BC signal S4 by inverting the digital BC signal S1. A second inverter 820 has an input coupled to receive the digital BC signal S2 and an output to generate the digital BC signal S5 by inverting the digital BC signal S2. Finally, a third inverter 830 has an input coupled to receive the digital BC signal S3 and an output to generate the digital BC signal S6 by inverting the digital BC signal S3.

The embodiments of the invention shown in FIGS. 5-8 including digital circuitry to generate the digital BC signals S1-S6 provide a benefit following a power saving mode in a device. When a device enters a power saving mode the digital BC signals S1-S6 that are stored in the register 540 remain there while the timing monitor circuit 500 and the CDN 510 are switched off to save power. When the device emerges from the power saving mode the timing monitor circuit 500 and the CDN 510 are switched on and the digital BC signals S1-S6 are available from the register 540 within a few clock cycles to adjust power received by buffer circuits in the CDN 510. It is not necessary to wait for a VCDL to lock a clock signal to generate BC signals.

Figure 9:
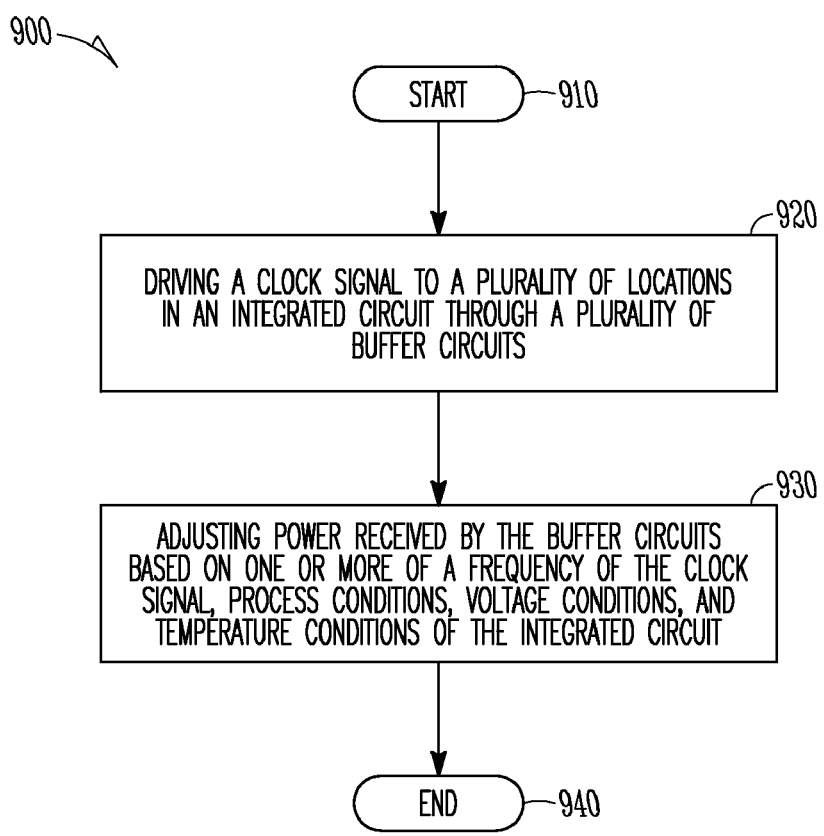
FIG. 9 is a flow diagram of several methods according to an embodiment of the invention.

FIG. 9 is a flow diagram of several methods 900 according to an embodiment of the invention. In block 910, the methods 900 start. In block 920, a clock signal is driven to a plurality of locations in an integrated circuit through a plurality of buffer circuits. In block 930, power received by the buffer circuits is adjusted based at least partially on one or more of a frequency of the clock signal, process conditions, voltage conditions, and temperature conditions of the integrated circuit. In block 940, the methods 900 end.

Power received by the buffer circuits shown in FIGS. 3, 4, 6, and 7 and described above is increased when the frequency of the clock signal increases and is decreased when the frequency of the clock signal decreases according to embodiments of the invention.

Figure 10:
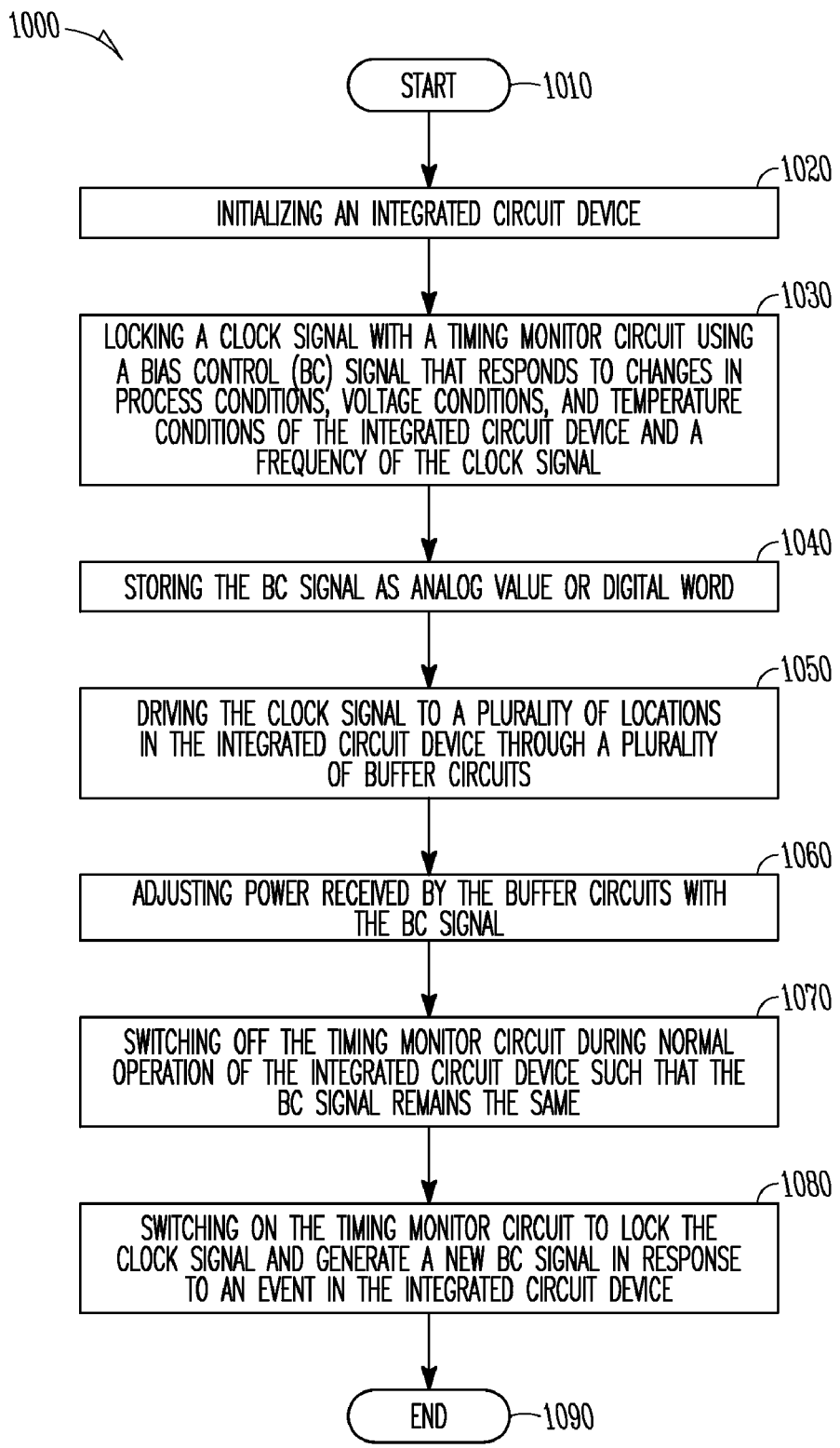
FIG. 10 is a flow diagram of several methods according to an embodiment of the invention.

FIG. 10 is a flow diagram of several methods 1000 according to an embodiment of the invention. In block 1010, the methods 1000 start. In block 1020, an integrated circuit device is initialized during, for example, a power-up or a reset procedure. In block 1030, a clock signal is locked with a timing monitor circuit using a BC signal that responds at least partially to changes in process conditions, voltage conditions, and temperature conditions of the integrated circuit device and a frequency of the clock signal. In block 1040, the BC signal is stored as analog value or digital word. In block 1050, the clock signal is driven to a plurality of locations in the integrated circuit device through a plurality of buffer circuits. In block 1060, power received by the buffer circuits is adjusted with the BC signal. More than one BC signal may be applied to adjust the power received by the buffer circuits according to embodiments of the invention. In block 1070, the timing monitor circuit is switched off during normal operation of the integrated circuit device such that the BC signal remains the same. This saves power and maintains consistent timing relationships in the integrated circuit device. In block 1080, the timing monitor circuit is switched on to lock the clock signal and generate a new BC signal in response to an event in the integrated circuit device. The event may be a voltage drift or a temperature drift in the integrated circuit device, or a change in the frequency of the clock signal. In block 1090, the methods 1000 end.

The individual activities of methods 900 or 1000 may not have to be performed in the order shown or in any particular order. Some activities may be repeated, and others may occur only once. Embodiments of the invention may have more or fewer activities than those shown in FIG. 9 or FIG. 10.

Figure 11:
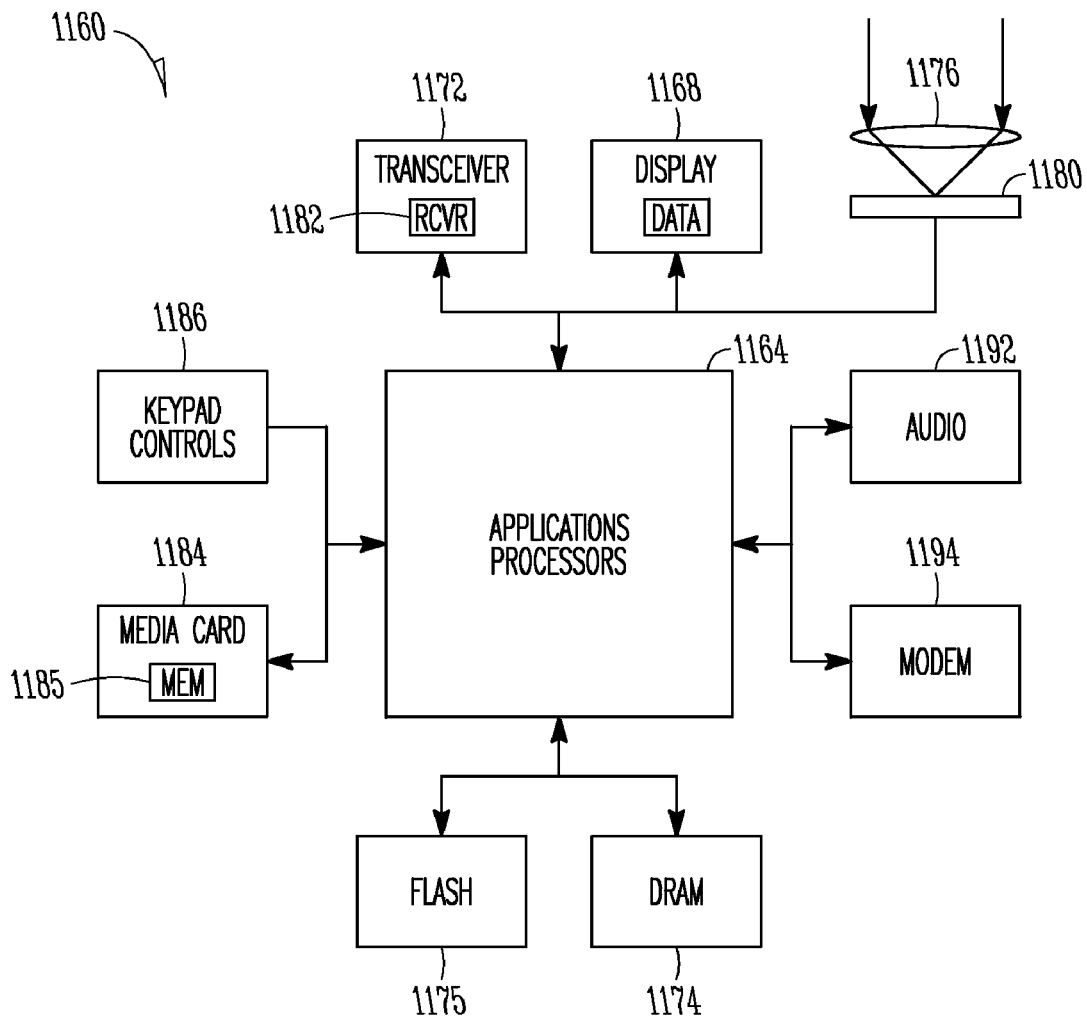
FIG. 11 is a block diagram of a system according to an embodiment of the invention.

FIG. 11 is a block diagram of a system 1160 according to an embodiment of the invention. The system 1160, in some embodiments, may include a processor 1164 coupled to a display 1168 and/or a wireless transceiver 1172. The display 1168 may be used to display data, perhaps received by the wireless transceiver 1172. The system 1160, in some embodiments, may include a memory device such as a dynamic random access memory (DRAM) 1174 and/or a Flash memory 1175. The processor 1164 is coupled to exchange data with the DRAM 1174 and the Flash memory 1175. The DRAM 1174 may be a synchronous DRAM (SDRAM).

In some embodiments, the system 1160 may include a camera including a lens 1176 and an imaging plane 1180 to couple to the processor 1164. The imaging plane 1180 may be used to receive light captured by the lens 1176.

Many variations are possible. For example, in some embodiments, the system 1160 may include a cellular telephone receiver 1182 forming a portion of the wireless transceiver 1172. The cellular telephone receiver 1182 may also receive data to be processed by the processor 1164, and displayed on the display 1168. In some embodiments, the system 1160 may include an audio, video, or multi-media player 1184, including a memory device 1185 and a set of media playback controls 1186 to couple to the processor 1164. The processor 1164 may also be coupled to exchange data with an audio device 1192 and/or a modem 1194.

Any of the electronic components of the system 1160 may include a CDN with a timing monitor circuit according to embodiments of the invention described herein. For example, one or more of the processor 1164, the DRAM 1174, and the Flash memory 1175 may include a CDN with a timing monitor circuit according to embodiments of the invention described herein. Implementation of the embodiments of the invention described herein can reduce power consumption in an integrated circuit while maintaining performance and accuracy in a clock signal distributed by a CDN.

Any of the circuits or systems described herein may be referred to as a module. A module may comprise a circuit and/or firmware according to embodiments of the invention.

The above description and the drawings illustrate some embodiments of the invention to enable those skilled in the art to practice the embodiments of the invention. Other embodiments may incorporate structural, logical, electrical, process, and other changes. In the drawings, like features or like numerals describe substantially similar features throughout the several views. Examples merely typify possible variations. Portions and features of some embodiments may be included in, or substituted for, those of others. Many other embodiments will be apparent to those skilled in the art upon reading and understanding the above description. Therefore, the scope of an embodiment of the invention is determined by the appended claims, along with the full range of equivalents to which such claims are entitled.

The Abstract is provided to comply with 37 C.F.R. §1.72(b) requiring an abstract that will allow the reader to quickly ascertain the nature of the technical disclosure. The Abstract is submitted with the understanding that it will not be used to interpret or limit the scope or meaning of the claims.

What is claimed is:

1. An apparatus comprising:
 a clock distribution network including an input coupled to receive an internal clock signal, and a plurality of buffer circuits coupled together and configured to drive the internal clock signal to a plurality of locations in an integrated circuit; and
 a timing monitor circuit including a plurality of delay elements, the timing monitor circuit coupled to receive the internal clock signal and configured to use the plurality of delay elements to generate digital bias control signals that vary with operating conditions of the integrated circuit, the timing monitor circuit configured to transmit the digital bias control signals to the plurality of buffer circuits to adjust power received by the plurality of buffer circuits.

2. The apparatus of claim 1, wherein the timing monitor circuit is configured to:
 generate the digital bias control signals to vary with a frequency of the internal clock signal.

3. The apparatus of claim 1, wherein the timing monitor circuit is configured to:
 generate the digital bias control signals to vary with process, voltage, or temperature conditions of the integrated circuit.

4. The apparatus of claim 1, wherein the internal clock signal is a first differential clock signal and the buffer circuits include current-mode logic buffer circuits, each current-mode logic buffer circuit comprising:
 two inputs configured to receive the first differential clock signal;
 two outputs configured to generate a second differential clock signal; and
 at least one bias device configured to receive one of the digital bias control signals to adjust power received by the current-mode logic buffer circuit.

5. The apparatus of claim 1, wherein the clock distribution network comprises:
 a tree of buffer circuits, each buffer circuit being coupled to receive at least one of the digital bias control signals to adjust power received by the buffer circuit.

6. An apparatus comprising:
 a clock distribution network including an input coupled to receive an internal clock signal, and a plurality of buffer circuits coupled together and configured to drive the internal clock signal to a plurality of locations in an integrated circuit;
 a timing monitor circuit including a plurality of delay elements, the timing monitor circuit coupled to receive the internal clock signal and configured to use the plurality of delay elements to generate digital bias control signals that vary with operating conditions of the integrated circuit, the timing monitor circuit configured to transmit the digital bias control signals to the plurality of buffer circuits to adjust power received by the plurality of buffer circuits; and
 a register configured to store data bits representing the digital bias control signals.

7. The apparatus of claim 6, wherein the timing monitor circuit includes a delay locked loop comprising:
 a phase detector configured to detect a phase difference between the internal clock signal at a first location and the internal clock signal at a second location;
 a charge pump configured to perform a charge pumping operation based upon the detected phase difference;
 a low pass filter configured to filter an output from the charge pump; and
 a delay line including the plurality of delay elements, the plurality of delay elements being serially-coupled, the first location being coupled to and separated from the second location by some of the delay elements.

8. The apparatus of claim 6, wherein the plurality of delay elements are serially-coupled together.

9. An apparatus comprising:
 a clock distribution network including an input coupled to receive an internal clock Signal, and a plurality of buffer circuits coupled to either and configured to drive the internal clock signal to a plurality of locations in an integrated circuit;
 a timing monitor circuit coupled to receive the internal clock signal and configured to generate digital bias control signals that vary with operating conditions of the integrated circuit, the digital bias control signals provided respectively to the buffer circuits to adjust power received by the buffer circuits;
 a register configured to store data bits representing the digital bias control signals, wherein each buffer circuit comprises a current-mode logic buffer circuit including:
  a first transistor having a drain coupled to a first adjustable resistor, a source, and a gate coupled to receive a first input signal, the first adjustable resistor having a resistance adjusted by the digital bias control signals; and
  a second transistor having a drain coupled to a second adjustable resistor, a source coupled to the source of the first transistor and a bias network, and a gate coupled to receive a second input signal, the second adjustable resistor having a resistance adjusted by the digital bias control signals; and
  wherein the drain of the first transistor is coupled to generate a first output signal and the drain of the second transistor is coupled to generate a second output signal.

10. An apparatus comprising:
 a clock distribution network including an input coupled to receive an internal clock signal, and a plurality of buffer circuits coupled together and configured to drive the internal clock signal to a plurality of locations in an integrated circuit;
 a timing monitor circuit coupled to receive the internal clock signal and configured to generate digital bias control signals that vary with operating conditions of the integrated circuit, the digital bias control signals provided respectively to the buffer circuits to adjust power received by the buffer circuits;
 a register configured to store data bits representing digital bias control signals wherein each buffer circuit comprises a current-mode logic buffer circuit including:
  a first transistor having a drain coupled to a first transistor load network, a source, and a gate coupled to receive a first input signal, the first transistor load network being controlled by the digital bias control signals to modulate a voltage swing in the buffer circuit; and
  a second transistor having a drain coupled to a second transistor load network, a source coupled to the source of the first transistor and a bias network, and a gate coupled to receive a second input signal, the second transistor load network being controlled by the digital bias control signals to modulate the voltage swing in the buffer circuit; and wherein the drain of the first transistor is coupled to generate a first output signal and the drain of the second transistor is coupled to generate a second output signal.

11. A method comprising:
receiving an internal clock signal at a timing monitor circuit including a plurality of delay elements;
driving the internal clock signal to a plurality of locations in an integrated circuit through a plurality of buffer circuits coupled together in a clock distribution network;
generating digital bias control signals using the plurality of delay elements, the digital bias control signals to vary with operating conditions of the integrated circuit;
transmitting the digital bias control signals to the plurality of buffer circuits; and
adjusting power received by the plurality of buffer circuits using the digital bias control signals.

12. The method of claim 11, further comprising:
determining a frequency of the internal clock signal; and
generating the digital bias control signals that vary with the operating conditions of the integrated circuit including the frequency of the internal clock signal.

13. The method of claim 12, wherein adjusting power received by the plurality of buffer circuits includes:
increasing power received by the buffer circuits when the frequency of the internal clock signal increases; and
decreasing power received by the buffer circuits when the frequency of the internal clock signal decreases.

14. The method of claim 12, wherein determining the frequency of the internal clock signal includes:
adjusting the digital bias control signals provided to a voltage controlled delay line to lock the internal clock signal in the voltage controlled delay line.

15. The method of claim 14, further comprising:
tapping one or more clock signals from different locations in the voltage controlled delay line to generate multiple clock signals with different phases.

16. A method comprising:
receiving an internal clock signal at a timing monitor circuit including a plurality of delay elements;
driving the internal clock signal to a plurality of locations in an integrated circuit through a plurality of buffer circuits coupled together in a clock distribution network;
generating digital bias control signals using the plurality of delay elements that vary with operating conditions of the integrated circuit;
storing data bits representing the digital bias control signals;
transmitting the digital bias control signals to the plurality of buffer circuits; and
adjusting power received by the plurality of buffer circuits with the digital bias control signals.

17. The method of claim 16, wherein generating digital bias control signals comprises:
generating digital bias control signals at least partially based on process, voltage, or temperature conditions of the integrated circuit.

18. The method of claim 16, wherein adjusting power received by the plurality of buffer circuits comprises:
providing the digital bias control signals to respective bias devices in each buffer circuit to adjust the power received by the buffer circuit.

19. The method of claim 16, wherein adjusting power received by the plurality of buffer circuits comprises:
providing the digital bias control signals to respective adjustable resistors in a buffer circuit to adjust a resistance of the adjustable resistors.

20. The method of claim 16, wherein adjusting power received by the plurality of buffer circuits comprises:
providing the digital bias control signals to respective transistor load networks in a buffer circuit to modulate a voltage swing in the buffer circuit.

21. The method of claim 16, wherein receiving the internal clock signal includes receiving a differential clock signal, and wherein driving the internal clock signal to a plurality of locations in the integrated circuit comprises:
driving the differential clock signal through a plurality of current-mode logic buffer circuits coupled together in the clock distribution network.

22. A method comprising:
receiving an internal clock signal;
driving the internal clock signal to a plurality of locations in an integrated circuit through a plurality of buffer circuits coupled together in a clock distribution network;
generating digital bias control signals that vary with operating conditions of the integrated circuit in a timing monitor circuit;
storing data bits representing the digital bias control signals;
adjusting power received by the buffer circuits with the digital bias control signals;
switching off the clock distribution network and the timing monitor circuit during a power saving mode;
switching on the clock distribution network at the end of the power saving mode; and
adjusting the power received by the buffer circuits with digital bias control signals derived from the stored data bits following the end of the power saving mode.

23. The method of claim 22, wherein storing data bits comprises:
storing the data bits in a register.

24. The method of claim 22, wherein generating digital bias control signals includes converting bias control signals in an analog-to-digital converter.

25. The method of claim 22, further comprising:
switching off the timing monitor circuit during a normal mode to save power;
switching on the timing monitor circuit; and
adjusting the power received by the buffer circuits with the digital bias control signals generated before the timing monitor circuit was switched off.

26. The method of claim 25, further comprising switching on the timing monitor circuit to generate digital bias control signals after the timing monitor circuit was switched off in response to an event occurring within the integrated circuit.

27. A method comprising:
receiving an internal clock signal;
driving the internal clock signal to a plurality of locations in an integrated circuit through a plurality of buffer circuits coupled together in a clock distribution network;
generating bias control signals that vary with operating conditions of the integrated circuit in a timing monitor circuit;
storing data bits representing the bias control signals;

adjusting power received by the buffer circuits with the bias control signals;

switching off the clock distribution network and the timing monitor circuit during a power saving mode;

switching on the clock distribution network at the end of the power saving mode; and adjusting the power received by the buffer circuits with bias control signals derived from the stored data bits following the end of the power saving mode.

28. The method of claim 27, wherein storing the data bits comprises:

storing the data bits in a register.

29. The method of claim 27, further comprising:

switching off the timing monitor circuit during a normal mode to save power;

switching on the timing monitor circuit to generate bias control signals after the timing monitor circuit was switched off in response to an event occurring within the integrated circuit; and adjusting the power received by the buffer circuits with bias control signals derived from the stored data bits following the event.

* * * * *

UNITED STATES PATENT AND TRADEMARK OFFICE
CERTIFICATE OF CORRECTION

PATENT NO. : 8,392,744 B2
APPLICATION NO. : 13/251981
DATED : March 5, 2013
INVENTOR(S) : Feng Lin Page 1 of 1

It is certified that error appears in the above-identified patent and that said Letters Patent is hereby corrected as shown below:

In the Claims:

In column 10, line 12, in Claim 9, delete "Signal," and insert -- signal, --, therefor.

In column 10, line 13, in Claim 9, delete "to either" and insert -- together --, therefor.

In column 10, line 52, in Claim 10, delete "representing" and insert -- representing the --, therefor.

Signed and Sealed this
Seventh Day of May, 2013

Teresa Stanek Rea
*Acting Director of the United States Patent and Trademark Office*